Jan. 24, 1950 J. SMITH 2,495,353

MOUNTING ARRANGEMENT FOR CIRCUIT ELEMENTS

Filed Sept. 18, 1948

JOHN SMITH
*INVENTOR.*

*BY* Bruce L. Birchard
HIS AGENT

Patented Jan. 24, 1950 2,495,353

UNITED STATES PATENT OFFICE 2,495,353

MOUNTING ARRANGEMENT FOR CIRCUIT ELEMENTS

John Smith, Chicago, Ill., assignor to Zenith Radio Corporation, a corporation of Illinois Application September 18, 1948, Serial No. 49,965

3 Claims. (Cl. 175—366)

This invention relates to mounting arrangements for electrical circuit elements, and more particularly, to such mounting arrangements as facilitate handling of such an element in assembling it, for example, to the chassis of electronic equipment such as a radio receiver or the like. It is a primary object of this invention to provide an improved and simplified circuit element mounting arrangement.

It is an important object of the present invention to provide an improved mounting arrangement for a circuit element of the type not inherently provided with convenient electrical connection terminals to which wiring may be soldered, such as, for example, selenium or copper oxide rectifiers.

It is a further object of the present invention to provide an improved mounting arrangement for circuit elements which, of themselves, are so small as to be inconvenient to handle.

Still a further important object of the present invention is to provide such a mounting arrangement having the additional advantage of being particularly adapted to mass production techniques on a rapid and economical basis.

In accordance with one form of the present invention, a circuit element, such as a contact rectifier or a condenser, is positioned within an aperture in an insulating washer, and a pair of pliable insulating members, each bearing an outwardly disposed electrical terminal electrically connected to an inwardly directed shouldered contact portion, are sandwiched about the circuit element-bearing member. The contact portions are locked in firm abuttal relation with the circuit element by securing the sandwiching members to the circuit element-bearing member in at least two places; the resiliency of the pliable sandwiching members insures a low resistance electrical connection between the circuit element and the outwardly disposed electrical terminals.

The features of the present invention which are believed to be novel are set forth with particularity in the appended claims. The invention, together with further objects and advantages thereof, may more readily be understood, however, by reference to the following description taken in connection with the accompanying drawings, in which like reference numerals indicate like elements, and in which:

Figure 1:
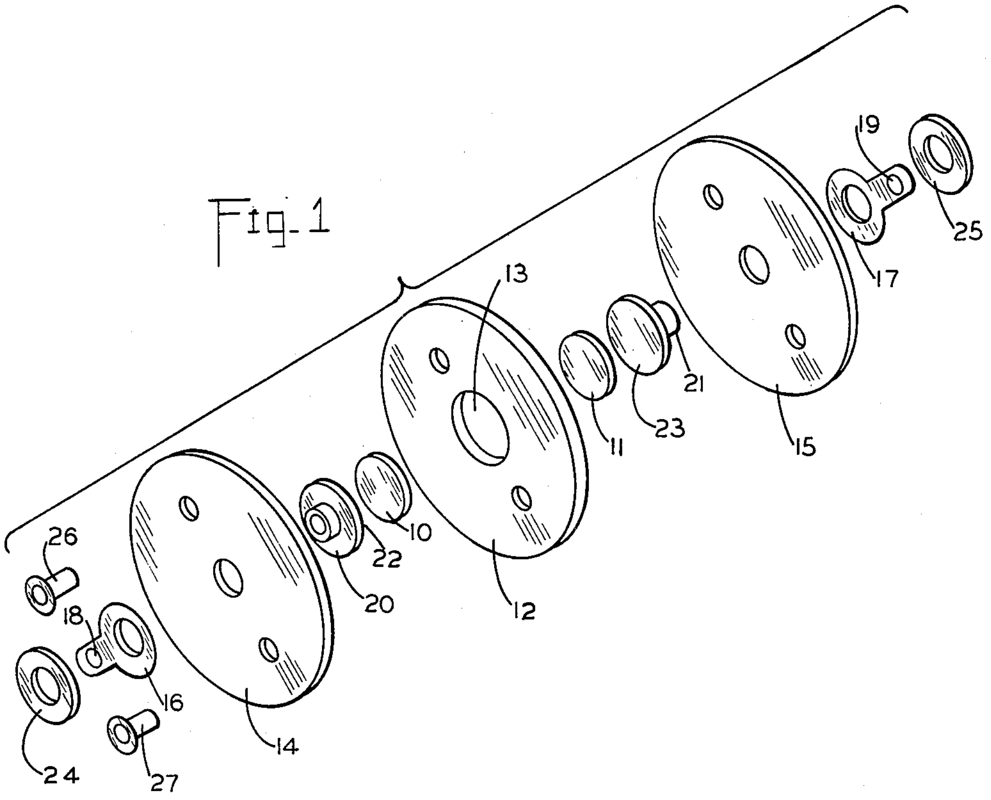
Figure 1 is an exploded view of a preferred embodiment of the invention.

Referring now to Figure 1, there is shown an exploded view of a present preferred embodiment of the invention. For purposes of illustration, the circuit element shown comprises a pair of selenium rectifier discs 10 and 11, although it is to be understood that other circuit elements, such as certain types of condensers and copper oxide rectifiers, fall within the contemplation of the present invention. The use of a circuit element comprising a pair of rectifier discs in proper abuttal relation with each other is advantageous in applications where the back voltage rating of a single disc is likely to be exceeded. Also, by employing two such discs, the capacity of the unit is decreased, thus permitting operation at a higher frequency than is practicable when only a single disc is used. However, a single disc unit may be used for applications in which high back voltage rating and low capacity are not essential.

A flat supporting member or washer 12, provided with an aperture 13 for receiving the circuit element comprising rectifier discs 10 and 11, is sandwiched between a pair of pliable members 14 and 15 each of which has an aperture in alignment with the aperture 13 of supporting member 12. In the preferred embodiment shown, members 12, 14, and 15 are shown to be circular in form; it is, however, contemplated that other configurations may be desirable in certain applications.

A pair of outwardly disposed electrical terminals 16 and 17, apertured at 18 and 19, respectively, to facilitate wiring to an associated electrical circuit (not shown), are preferably riveted to the pliable members 14 and 15 by means of contact devices 20 and 21 formed for riveting and having contact portions 22 and 23 abutting the circuit element and overlapping the apertures of pliable members 14 and 15 respectively, the contact portions 22 and 23 of the contact devices 20 and 21 being inwardly disposed and forming electrical contacts which are electrically connected with terminals 16 and 17. While flat contact heads are preferred in order to insure good electrical contact over a large area, contact devices 20 and 21 may, in some applications, consist simply of a pair of ordinary rivets having round heads. A pair of metal washers 24 and 25 may be provided to insure good electrical contact between contact devices 20 and 21 and terminals 16 and 17.

In assembly, the circuit element, which may comprise rectifier discs 10 and 11 placed in firm abuttal relation with each other in such manner as to pass current substantially in one direction only, is placed within the aperture 13 in supporting member 12. Terminals 16 and 17 and washers 24 and 25 are fastened to pliable members 14 and 15 by means of contact devices 20 and 21 respectively, as by riveting or the like. The terminal bearing members 14 and 15 are then brought into contiguous relation with circuit element-bearing member 12 with contact portions 22 and 23 in substantial alignment with the circuit element; fastening means, as for example rivets 26 and 27, are provided for securing terminal-bearing members 14 and 15 to supporting member 12 in at least two places. It is preferred that two substantially diametrically opposite fastening rivets 26 and 27 be used, although three or more substantially equally circumferentially spaced rivets may be used. In this manner, contact portions 22 and 23 are locked in abuttal relation with the terminal faces of the circuit element. Furthermore, if the combined thickness of the circuit element, comprising rectifier discs 10 and 11, and the two contact portions 22 and 23 is greater than the thickness of supporting member 12, the resiliency of pliable members 14 and 15 insures good low resistance electrical connection between contact heads 22 and 23 and the terminals of the circuit element. Terminals 16 and 17 may be bent outwardly to facilitate the soldering thereto of suitable wire connections to an associated circuit (not shown).

Figure 2:
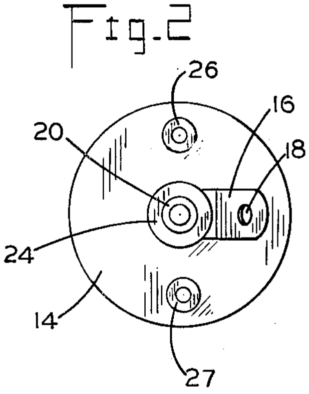
Figure 2 is an assembled view of the embodiment shown in Figure 1.
Figure 3:
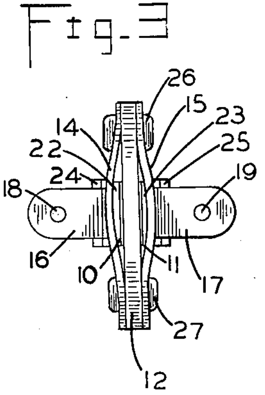
Figure 3 is a side elevation of the embodiment of Figure 2.

The assembled unit is shown in Figures 2 and 3.

For purposes of economy, it is preferred that member 12 be formed of phenolic resin, insulating paper, or inexpensive plastic material, and that members 14 and 15 be formed of a linen base phenolic resin, fish paper, or other similar material, the only required property for members 14 and 15 being pliability. It is preferred for simplicity's sake that members 12, 14, and 15 be constructed of insulating material, although it is only essential that circuit element be insulated from the locking rivets 26 and 27. For example, members 12, 14, and 15 may be formed of conducting material if insulating bushings are provided for rivets 26 and 27. Alternatively, member 12 may be constructed of conductive material and members 14 and 15 of insulating material if an insulating insert is provided within aperture 13 for insulating the circuit element from member 12.

While the invention has been shown and described in connection with a present preferred embodiment, it is to be understood that numerous variations and modifications may be made. It is therefore contemplated, in the appended claims, to cover all such variations and modifications as fall within the true spirit and scope of the invention.

I claim:

1. A mounting arrangement for an electrical circuit element including: a supporting member having an aperture for receiving said circuit element; a pair of pliable members disposed on opposite sides of said supporting member and each having an aperture in alignment with the aperture of said supporting member; a pair of contact devices projecting through the respective apertures of said pliable members and each having a contact portion abutting said circuit element and overlapping the aperture of its associated pliable member, the combined thickness of said contact portions and said circuit element being greater than the thickness of said supporting member; and fastening means insulated from said circuit element for securing said pliable members to said supporting member in at least two places effectively to lock said contact portions in abuttal relation with said circuit element.

2. A mounting arrangement for an electrical circuit element including: a supporting member constructed of electrically insulating material and having an aperture for receiving said circuit element; a pair of pliable members of insulating material sandwiching said supporting member and each having an aperture in substantially coaxial alignment with the aperture of said supporting member; a pair of contact devices projecting through the respective apertures of said pliable members and each having a contact portion abutting said circuit element and overlapping the aperture of its associated pliable member, the combined thickness of said contact portions and said circuit element being greater than the thickness of said supporting member; an outwardly disposed electrical terminal secured to each of said pliable members and electrically connected with the contact device associated with each of said pliable members; and fastening means for securing said pliable members to said supporting member in at least two places effectively to lock said contact portions in abuttal relation with said circuit element.

3. A mounting arrangement for an electrical circuit element including: a washer constructed of electrically insulating material and provided with a substantially centrally located aperture for receiving said circuit element; a pair of pliable discs of insulating material sandwiching said washer and each having a substantially centrally located aperture; a pair of contact devices projecting through the respective apertures of said pliable discs and each having a contact portion abutting said circuit element and overlapping the aperture of its associated pliable disc; an outwardly disposed electrical terminal secured to each of said pliable discs and electrically connected with the contact device associated with each of said pliable discs; and fastening means for securing said pliable discs to said washer in two substantially diametrically opposite places effectively to lock said contact portions in abuttal relation with said circuit element.

JOHN SMITH.

No references cited.